Nov. 30, 1926.
R. E. JACOBS
1,608,697
ELECTRIC MOTOR FRAME
Filed August 14, 1924    2 Sheets-Sheet 1
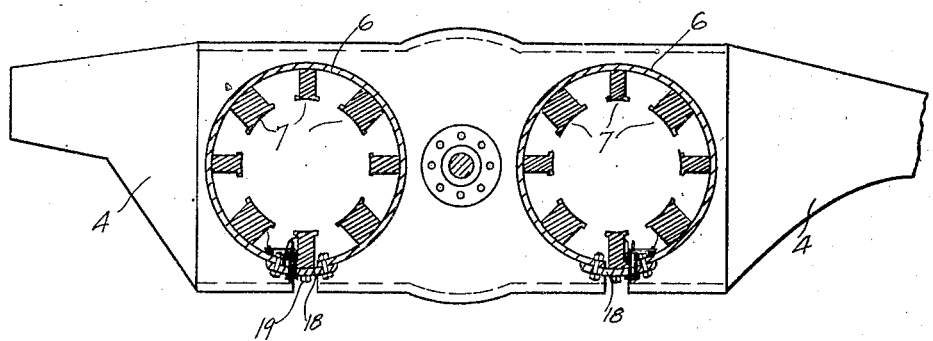
FIG I
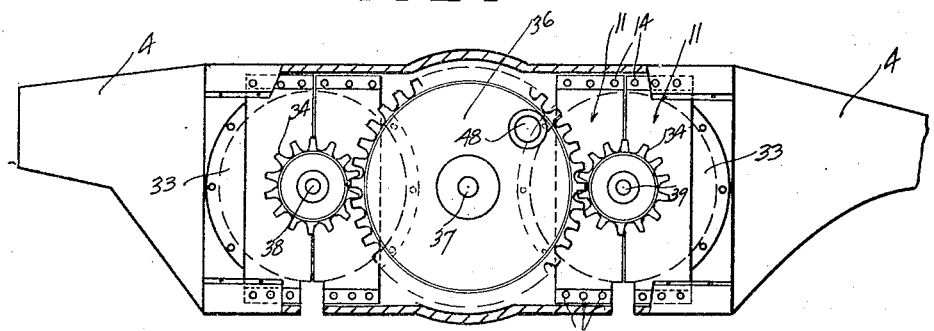
FIG II
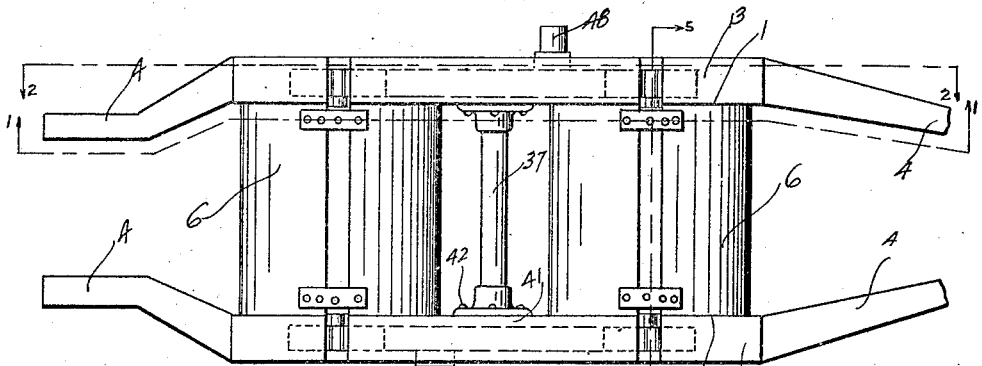
FIG III
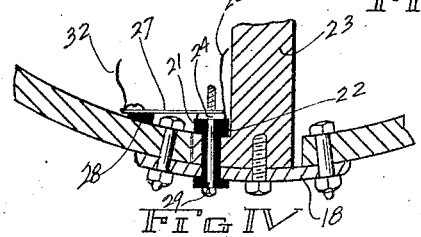
FIG IV
INVENTOR
R.E. JACOBS
BY Munn & Co
ATTYS Nov. 30, 1926.
R. E. JACOBS
1,608,697
ELECTRIC MOTOR FRAME
Filed August 14, 1924    2 Sheets-Sheet 2
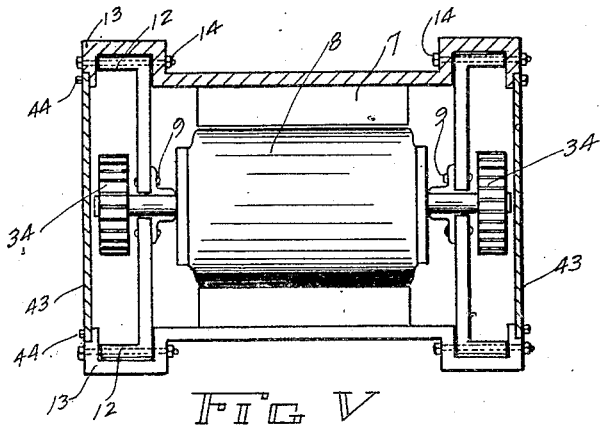
FIG V
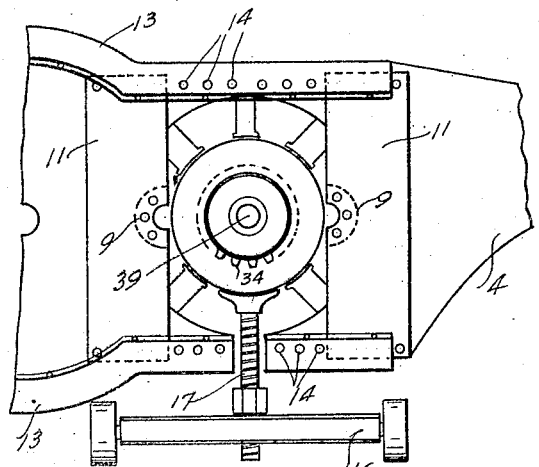
FIG VI
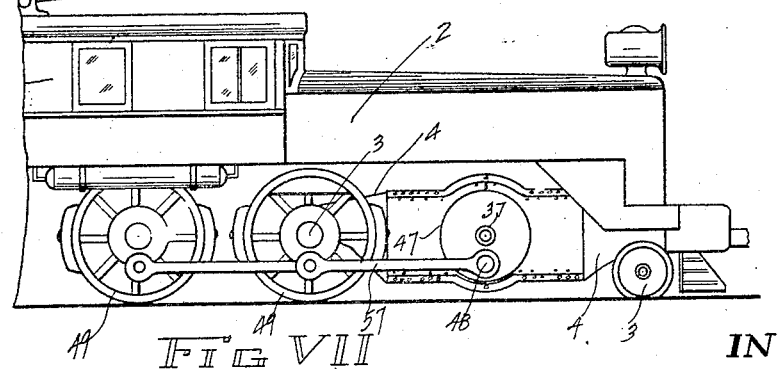
FIG VII
INVENTOR
R. E. JACOBS
BY Munn & Co
ATTYS Patented Nov. 30, 1926.

1,608,697

UNITED STATES PATENT OFFICE.

REED E. JACOBS, OF SAN FRANCISCO, CALIFORNIA.

ELECTRIC MOTOR FRAME.

Application filed August 14, 1924. Serial No. 732,094.

The present invention relates to improvements in electric motor frames and has particular reference to the mounting means for the motor of a motor driven vehicle such as an electric locomotive or a street railway car.

It is particularly proposed in the present invention to construct the motor in such a manner that it is permanently built into the frame supporting the same whereby any shifting of the motor or any dislocation of any part thereof becomes impossible. It is further proposed to construct the motor in such a manner that elevating means such as a jack mounted on a small truck may be brought into operative proximity with the armature while the same is within the motor and may be made to take the weight of the armature, allowing the bearings for the armature to be removed and allowing furthermore the entire armature to be removed from the motor housing by axial motion without disturbing the motor housing. It is further proposed to provide removable bearings for the armature shaft, the bearings comprising two co-acting elements adapted to be separated so as to clear the way when it is desired to remove the armature by axial motion. It is further proposed to arrange a drive shaft in alignment with the two armature shafts of the two motors whereby a better balance is obtained than is possible with the present arrangements. Further objects and advantages of my device will appear as the specification proceeds.

The preferred form of my invention is illustrated in the accompanying drawings in which Figure 1 shows a longitudinal section through my device taken along line 1—1 of Figure 3, Figure 2 a second section taken along line 2—2 of Figure 3, Figure 3 a bottom plan view of same, Figure 4 an enlarged detail view illustrating the attaching means for a removable section, Figure 5 a vertical transverse section taken along line 5—5 of Figure 3, Figure 6 a detail view explaining the operation of removing the armature by means of a jack mounted on a track, and Figure 7 an assembly view showing my motor arrangement in connection with an electric locomotive. While I have shown only the preferred form of the invention it should be understood that various changes or modifications may be made within the scope of the claims hereto attached without departing from the spirit of the invention.

In the preferred form of my invention two spaced elements such as the plates 1 form an integral part of the frame of the locomotive 2, and are supported on axles 3 by means of suitable brackets 4. The two plates are disposed parallel to one another and are spaced by tubular members 6, which latter are open-ended and are welded or otherwise permanently fastened to the two plates 1, which latter present openings corresponding to the size of the tubes so that the same are accessible from the outside throughout the dimensions thereof. The tubes, of which two are shown in Figure 1, form the motor housings and each of them has a plurality of pole pieces 7 permanently secured thereto in peripheral arrangement. The armature 8 in each housing is supported in bearings 9 which latter are split vertically, the two halves being supported on two sliding elements 11, which latter present horizontal upper and lower flanges 12, riding in channels 13 formed by upper and lower flanges of the two plates 1. When the two slides 11 are moved together and fastened in place by means of bolts 14, the bearings 9 are in an operative position to co-operate in supporting the armature. The slides 11 may, however, after the bolts 14 have been removed, be slid apart whereby the armature is not only left without support but whereby the ends of the tubes are cleared to allow the armature to be removed from the housing by axial motion.

One of the principal features of my invention is the providing of means for portably supporting the armature while the same is in the cage or the housing independently of the bearings so that the latter may be removed without causing the armature to change its position. This means comprises a small truck 16 adapted to be pushed underneath the car having one or more jacks 17 of any suitable construction mounted thereon, and a removable section 18 in the motor housings which when removed provides a slot 19 in the bottom of the motor housings, allowing the jack 17 to pass therethrough into operative relation relative to the armature so that when the jack is slightly raised by any suitable means it will take the weight of the armature and support the same independently of the bearings. It will be seen that in this manner, after the section 18 has been removed from the housing, the truck 16 may be pushed underneath the locomotive with the jack 17 passing through the slot 19 whereupon the jack 17 may be raised to take the weight of the armature, thereby allowing the two sliding elements 11 to be slid apart without affecting the position of the armature. After the slides 11 have been moved out of the way the truck 16 may be pulled forward and the entire armature may be removed with the truck by axial motion, thereby not only rendering the armature itself readily accessible for repair work but also the housing and all the individual parts thereof.

It will be noticed that the section 18 may be used to support one of the pole pieces as shown in Figure 1, in which latter case suitable means should be employed for readily establishing connection between the windings of the pole piece held by the section and the windings on the other pole pieces. A convenient way of establishing the connection is shown in detail in Figure 4, in which an insulating bushing is illustrated as extending through the removable section 18 and a flange 22 of the pole piece 23. A contact 24 is mounted on the bushing and connected to the wire 26 of the pole piece. A second contact 27 is mounted on an insulating block 28 secured to the non-removable part of the housing and extends over the contact 24 so that a screw 29 passed through the bushing and threadedly engaging the two contacts 24 and 27 may draw the same together. The contact 27 is connected with the windings of the adjacent pole pieces 37 through the wire 32. Two of these contact arrangements are necessary to connect the windings of the removable pole piece to the windings of the two adjacent pole pieces. The two slides 11 may not be made sufficiently wide to cover the entire opening of the tubes, and fillers 33 of some light material may be used to completely close the ends of the tubes.

Within the space enclosed by the two channels 13, I provide the pinions 34 which mesh with the large gear wheels 36 mounted on the shaft 37 which latter is disposed in alignment with the two armature shafts 38 and 39. The shaft 37 may be removably secured to the hubs 41 of the gear wheels 36 by means of bolts 42. A cover plate 43 may be secured as shown at 44 to cover the space within the channels 13, a suitable opening 47 being provided in the cover plates to allow of revolving motion of the stud 48 mounted eccentrically on the gear wheels 36 and suitably connected with the wheels 49 of the locomotives through connecting rods 57.

The advantages of my invention will be readily understood from the foregoing description: They consist in greater strength and rigidity of the entire unit; in greater accessibility of all parts of the machine for removal and replacement, including the pole pieces, armature and the gears; in greater power capacity, due to the fact that fields and armatures may be made wider in this arrangement than would ordinarily be possible, and finally in an equal distribution of strains, due to the fact that all shafts are mounted in a straight line.

I claim:

1. In combination, a motor frame having pole pieces arranged therein, a revolvable armature and removable means for supporting the armature in operative relation to the pole pieces said frame being formed with an axial slot to allow the insertion of independent means adapted for supporting the armature and moving the same axially from the frame, upon removal of the first named supporting means.

2. In combination, a motor frame having pole pieces arranged therein and a revolvable armature supported in operative relation to the pole pieces, the frame being formed with an axial open-ended slot to allow the insertion of independent means adapted for supporting the armature and moving the same axially from the frame.

3. In combination, a motor frame having pole pieces arranged therein and a revolvable armature supported in operative relation to the pole pieces, the frame being slotted axially to allow independent means to be introduced therethrough for supporting the armature.

4. In combination, a motor frame having pole pieces arranged therein, a revolvable armature supported in operative relation to the pole pieces, and a removable piece forming part of the frame, leaving an axial slot upon its removal for allowing independent supporting means for the armature to be introduced therethrough.

5. In combination, a frame comprising two spaced plates, each having an opening therein; an open-ended, tubular member connecting the plates and registering with said openings; pole pieces arranged circumferentially in the tubular member; a revolvable armature in the tubular member; and removable means supported by the plates providing bearings for the armature.

6. In combination, a frame comprising two spaced parallel plates, an open-ended tubular member connecting the same and formed integral therewith, pole pieces arranged circumferentially in said tubular member, a revolvable armature in said tubular member, and sliding elements supported by the plates coacting to provide bearings for the armature.

7. In combination, a frame comprising two spaced parallel plates, an open-ended tubular member connecting the same and formed integral therewith, pole pieces arranged circumferentially in said tubular member, a revolvable armature in said tubular member, and laterally sliding elements supported by the plates coacting to provide bearings for the armature.

8. In combination, a frame comprising two spaced parallel plates, an open-ended tubular member connecting the same and formed integral therewith, pole pieces arranged circumferentially in said tubular member, a revolvable armature in said tubular member, and removable means supported by the plates providing bearings for the armature, the frame being formed to allow independent means to be introduced thereinto for supporting the armature so as to permit the bearing means to be removed.

9. In combination, a frame comprising two spaced parallel plates, two open-ended tubular members connecting the same and formed integral therewith, pole pieces arranged circumferentially in said tubular members, revolvable shafts having armatures thereon in said tubular members, means supported by the plates providing bearings for the armature shafts, a third shaft between the armature shafts and alined therewith, and means for transmitting motion from the armature shaft to the third shaft.

10. In an electrically propelled wheeled vehicle, a carriage, side elements supported in spaced and parallel relation thereon, a tubular member connecting the side elements and formed integral therewith, pole pieces arranged in said tubular member, an armature supported in the tubular member in operative relation to the pole pieces, and means for transmitting rotary motion from the armature to the vehicle wheels.

REED E. JACOBS.